United States Patent [19]

Föller

[11] 4,327,863

[45] May 4, 1982

[54] BIMETALLIC CONTROLLED STEAM TRAP

[75] Inventor: Werner Föller, Stuhr, Fed. Rep. of Germany

[73] Assignee: Gestra-KSB Vertriebsgesellschaft mbH & Co., Bremen, Fed. Rep. of Germany

[21] Appl. No.: 187,029

[22] Filed: Sep. 15, 1980

[30] Foreign Application Priority Data

Sep. 17, 1979 [DE] Fed. Rep. of Germany ....... 2937395

[51] Int. Cl.³ .............................................. F16T 1/08
[52] U.S. Cl. ................................... 236/59; 236/93 R; 236/101 B
[58] Field of Search ................... 236/59, 101 B, 93 R, 236/33, 66

[56] References Cited

U.S. PATENT DOCUMENTS

| | | | |
|---|---|---|---|
| 3,169,704 | 2/1965 | Domm et al. | 236/59 |
| 3,985,296 | 10/1976 | Fujiwara | 236/59 |
| 4,060,193 | 11/1977 | Foller | 236/59 |

FOREIGN PATENT DOCUMENTS 104719 9/1966 Denmark ............................ 236/59

Primary Examiner—William E. Tapolcai, Jr.
Attorney, Agent, or Firm—Allison C. Collard; Thomas M. Galgano

[57] ABSTRACT

A steam trap includes a housing having an inner chamber, a feed opening and a discharge opening disposed adjacent to one another and communicating with the inner chamber, and a control unit disposed in the chamber including at least one bimetallic plate, a locking member disposed at the low pressure end of the trap and secured to a valve spindle extending centrally through the bimetallic plate and having a cam mounted thereon for engagement with the bimetallic plate and a seat sleeve which defines a valve seat and an abutment for cooperative engagement with said locking member and bimetallic plate, respectively. The seat sleeve includes a feed bushing which, in cooperation with the valve spindle, defines a flow channel therebetween and the cam consists of a cap disposed over a free end of the feed bushing projecting above the bimetallic plate, on the latter of which the cap is supported. Either of the feed bushing or the cap is provided with at least one admission opening which communicates with the flow channel.

4 Claims, 1 Drawing Figure

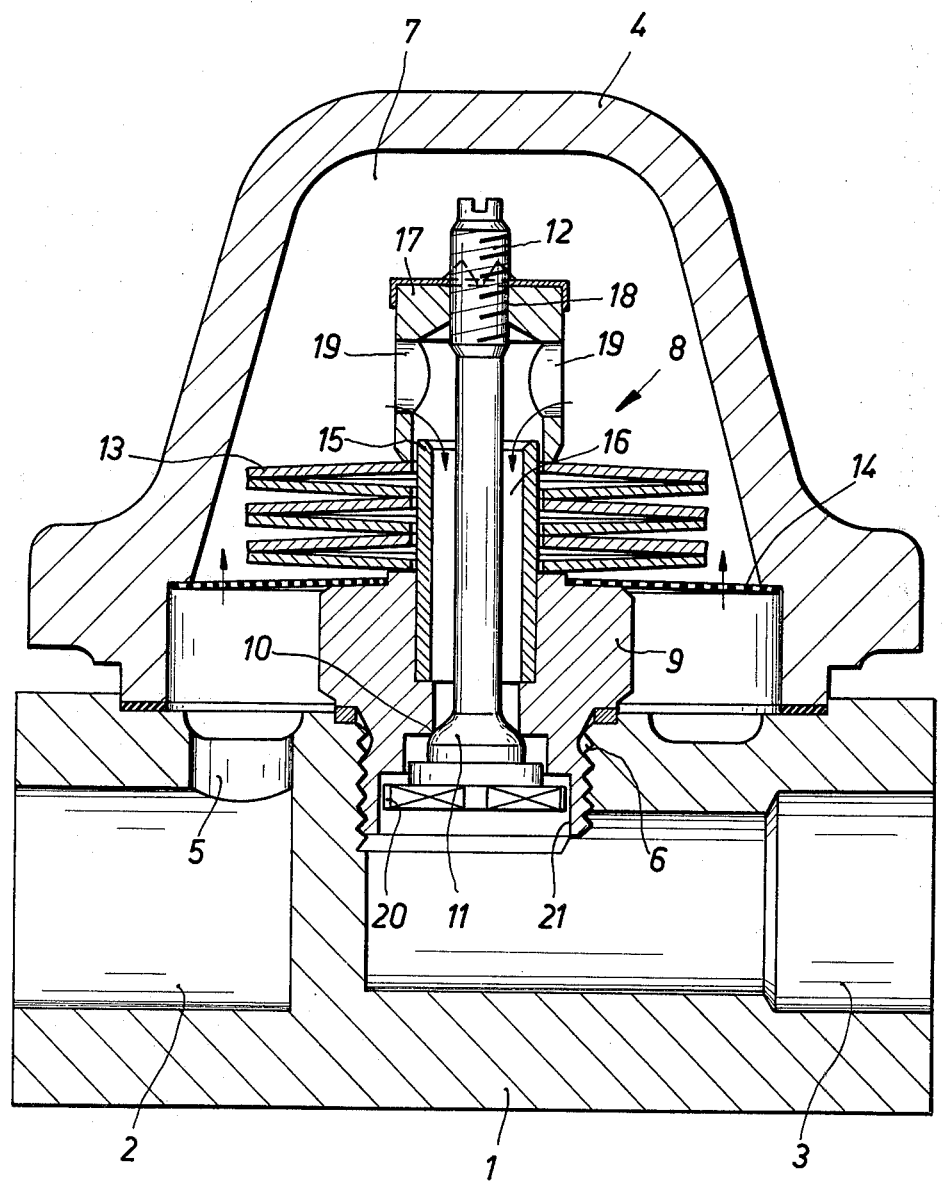

BIMETALLIC CONTROLLED STEAM TRAP

The invention relates to a steam trap. More particularly, it relates to a steam trap of the tyoe including a housing having an inner chamber, a feed opening and a discharge opening disposed adjacent to one another and communicating with the inner chamber, and a control unit disposed in the chamber including at least one bimetallic plate, a locking member secured to a valve spindle which extends centrally through the bimetallic plate and has a cam mounted thereon for engagement with the bimetallic plate and a seat sleeve having a valve seat and an abutment for cooperative engagement with the locking member and bimetallic plate, respectively.

Generally speaking, steam traps should discharge condensate without interference. On the other hand, these steam traps should avoid a discharge of steam. This requires a quick response time of the thermostatic control unit. The known steam traps (German Pat. Nos. 1,217,398 and 1,294,124) which are of the standard type and which include, for example, a lower housing portion having the associated feed and discharge channels, a thermostatic control unit joined to, and disposed laterally of, the lower housing portion, as well as a hood, lack of intensive flow of the discharging medium around the substantially superimposed bimetallic plates of the control unit. Therefore, a quick adjustment of the bimetallic plates to the prevailing temperature of the discharging medium is not possible, so that an undesirable condensate build-up or a steam loss may occur.

It is therefore an object of the present invention to provide a steam trap of the aforementioned type wherein a very fast response time of the bimetallic plates of the control unit is obtained.

This is achieved according to the present invention by the provision of a steam trap of the aforementioned type wherein the seat sleeve comprises a feed bushing which, in cooperation with the valve spindle, defines a flow channel therebetween and wherein the cam comprises a cap disposed over a free end of the feed bushing, projecting above the bimetallic plate, on the latter of which the cap is supported, and with either the feed bushing or the cap being provided with at least one admission opening which communicates with the flow channel. The flow path of the discharging medium goes through the feed opening into the inner chamber of the housing and immediately along the bimetallic plates of the control unit and from there through the feed bushing of the seat sleeve to the locking location spaced laterally from the feed opening. Thereby, a direct exposure of the bimetallic plates to the discharging medium is assured, so that a correspondingly quick response time by the control unit is obtained.

In addition, the feed bushing also acts as an excellent guide for the bimetallic plates. Due to the cam which encompasses the end of the feed bushing, the bimetallic plates may be so adjusted that they have a stroke adjusting effect on the locking portion; a particularly precise guide for the valve spindle is also obtained. Furthermore, the feed bushing is integrated into the control unit and thereby it does not constitute a part which has to be separately installed into the steam trap housing.

In a preferred embodiment, the feed bushing consists of a pipe which is inserted into the seat sleeve. This affords a particularly favorable manufacturing and inexpensive structure for the seat sleeve and the feed bushing. For example, the feed bushing may be made from commercially available drawn pipe material and, with respect to a unitary structure composed of the seat sleeve and the feed bushing, one eliminates many cutting operations.

Other objects and features of the present invention will become apparent from the following detailed description when taken in connection with the accompanying drawing which discloses one embodiment of the invention. It is to be understood that the drawing is designed for the purpose of illustration only, and is not intended as a definition of the limits of the invention.

In the drawing, a sectional view of a novel steam trap embodying the present invention is illustrated.

Referring now in detail to the drawing, a lower housing portion 1 is provided having an inlet or feed channel 2 and a discharge channel 3. Lower housing portion 1 is also provided with a hood or dome 4. A feed opening 5 and a discharge opening 6 of the prepressure end of the inner housing space or chamber 7 are provided adjacent to one another, in lower housing portion 1. A thermostatic control unit 8 is provided in inner housing chamber 7.

Control unit 8 comprises a seat sleeve 9 which is threadably received in discharge opening 6 and which defines a valve seat 10. Cooperating therewith and also a part of the control unit is a locking member 11 having a valve stem or spindle 12, a plurality of generally circular, superimposed, bimetallic plates 13 which are oppositely arched (when not in a cold state) with respect to each other, as well as a dirt screen 14; the locking member 11 being exposed to the prepressure in the opening direction.

Seat sleeve 9 is provided with a feed bushing 15 in the form of a wedged-in pipe which, on its exterior, has a guide for bimetallic plates 13; the lowermost plate being supported by seat sleeve 9. Feed bushing 15 is centrally penetrated by valve spindle 12, so as to define a flow channel 16 of annular cross-section between these two parts leading to the locking position 10,11. At its free end, valve spindle 12 carries a cap 17 having a receiving bore 18 at the base thereof for the purpose of receiving valve spindle 12. With its open end, cap 17 is mounted over the free end of feed bushing 15 which extends above bimetallic plates 13; its front end is supported on the upper bimetallic plate 13. Cap 17 is provided with feed openings 19 between its base and the free end of feed bushing 15.

Due to cap 17, the upper end of valve spindle 12 is exactly guided in a coaxial manner through feed bushing 15. The downstream end of locking member 11 is provided with radial lugs 20 for a further guiding; the lugs being centered in the discharge bore 21 of seat sleeve 9.

The flow path through the steam trap leads from feed channel 2 to feed opening 5 and immediately along bimetallic plates 13 to admission openings 19 and from there through flow channel 16 and the locking position 10,11 into discharge channel 3. Thereby, the bimetallic plates 13 are provided immediately and directly in the flow path and not in a flow dead space.

The medium which flows to the locking position 10, 11 flows immediately around bimetallic plates 13 which, in turn, adjust immediately to the prevailing temperature of the flowing medium and may effect a corresponding control of locking position 10, 11 by means of cap 17 and valve spindle 12.

Thereby, existing condensate is discharged without any condensate build-up while, on the other hand, an undesired escape of fresh steam is reliably prevented.

While only one embodiment of the present invention has been shown and described, it will be obvious that many changes and modifications may be made thereunto, without departing from the spirit and scope of the invention.

What is claimed is:

1. In a steam trap of the type including a housing having an inner chamber, a feed opening and a discharge opening disposed adjacent to one another and communicating with said inner chamber, and a control unit disposed in said chamber including at least one bimetallic plate, a locking member disposed at the low pressure side of said housing and secured to a valve spindle which extends centrally through said bimetallic plate and which has a cam mounted thereon for engagement with said bimetallic plate and a seat sleeve which defines a valve seat and an abutment for cooperative engagement with said locking member and the bimetallic plate, respectively, the improvement comprising:

said seat sleeve having a feed bushing supported thereon extending centrally through said bimetallic plate, which feed bushing, in cooperation with said valve spindle, defines a flow channel therebetween and said cam comprising a cap disposed over a free end of the feed bushing projecting from said bimetallic plate, on the latter of which said cap is supported, at least one of said feed bushing and said cap being provided with at least one admission opening which establishes communication between said inner chamber and said flow channel, said feed opening, said locking member and said valve seat being disposed on a side of said bimetallic plate distal from said free end of said feed bushing and said cap being disposed on another side of said bimetallic plate to proximate to said free end of said feeding bushing.

2. The steam trap according to claim 1, wherein said feed bushing comprises a pipe which is inserted into said seat sleeve.

3. The steam trap according to claim 1, wherein said feed bushing is supported solely on said seat sleeve.

4. The steam trap according to claim 1, wherein said valve spindle extends centrally through said feed bushing.

* * * * *